US009803859B2

(12) United States Patent
Donahue

(10) Patent No.: US 9,803,859 B2
(45) Date of Patent: Oct. 31, 2017

(54) OXYGEN ENRICHMENT OF ATMOSPHERIC AIR USING RELATIVE MOTION

(71) Applicant: Leonard Lawrence Donahue, Stratford, CT (US)

(72) Inventor: Leonard Lawrence Donahue, Stratford, CT (US)

( * ) Notice: Subject to any disclaimer, the term of this patent is extended or adjusted under 35 U.S.C. 154(b) by 0 days.

(21) Appl. No.: 15/431,433

(22) Filed: Feb. 13, 2017

(65) Prior Publication Data

US 2017/0234535 A1  Aug. 17, 2017

Related U.S. Application Data

(60) Provisional application No. 62/295,640, filed on Feb. 16, 2016.

(51) Int. Cl.
*F23L 7/00* (2006.01)
*B01D 53/14* (2006.01)
(Continued)

(52) U.S. Cl.
CPC .............. *F23L 7/007* (2013.01); *B01D 53/24* (2013.01); *B01D 53/30* (2013.01); *F01N 11/00* (2013.01); *F02M 25/12* (2013.01)

(58) Field of Classification Search
CPC .................................. F23L 7/00; B01D 53/14
(Continued)

(56) References Cited

U.S. PATENT DOCUMENTS 1,339,211 A   5/1920  McKernan
3,817,232 A   6/1974  Nakajima et al.
(Continued)

FOREIGN PATENT DOCUMENTS

EP  1716324 B1  5/2013
EP  2954943 A1  12/2015
(Continued)

OTHER PUBLICATIONS

V. Balepin et al, "Progress in Air Separation with the Vortex Tubes", AIAA-99-4844, 1999 (9th International Space Planes and Hypersonic Systems and Technologies Conference, Norfolk, VA).
(Continued)

*Primary Examiner* — Robert A Hopkins
(74) *Attorney, Agent, or Firm* — Anatoly Frenkel

(57) ABSTRACT

The specification and drawings present a new apparatus and method for continuously providing an oxygen-enriched gas/air using a relative motion of selected surface(s) of an apparatus (such as fossil-fueled combustion device/vehicle) relative to an atmospheric air with a speed exceeding a threshold value for, e.g., improving combustion, exhaust and related properties of the apparatus. An oxygen-enriched gas/air layer can be formed along/near each aforementioned surface from the atmospheric air due to pushing the atmospheric air along the surface(s) during that relative motion and collected by corresponding collector gate(s) located inside the apparatus near/adjacent to the corresponding surface. The apparatus can be an object (e.g., a vehicle) moving through the atmospheric air with a relative speed exceeding the threshold value. Alternatively, the apparatus can be a stationary object (e.g., a power generator) while the atmospheric air, having a desired speed exceeding the threshold value, is moved/blown toward the stationary object.

24 Claims, 12 Drawing Sheets

(51) Int. Cl.
    *F02M 25/12*     (2006.01)
    *F01N 11/00*     (2006.01)
    *B01D 53/24*     (2006.01)
    *B01D 53/30*     (2006.01)

(58) Field of Classification Search
    USPC .......................................................... 95/90
    See application file for complete search history.

(56) References Cited

U.S. PATENT DOCUMENTS

| | | |
|---|---|---|
| 4,351,302 A | 9/1982 | Brettler |
| 5,051,113 A | 9/1991 | Nemser |
| 5,051,114 A | 9/1991 | Nemser et al. |
| 5,400,746 A | 3/1995 | Susa |
| 5,526,641 A | 6/1996 | Sekar et al. |
| 5,553,591 A | 9/1996 | Yi |
| 5,640,845 A | 1/1997 | Ng et al. |
| 5,636,619 A | 6/1997 | Poola et al. |
| 5,649,517 A | 7/1997 | Poola et al. |
| 5,678,526 A | 10/1997 | Cullen |
| 5,779,770 A | 7/1998 | ShoichiroNitta |
| 6,543,428 B1 | 4/2003 | Biandino et al. |
| 9,254,493 B2 | 2/2016 | Inoue et al. |
| 9,375,546 B2 | 6/2016 | Ruff |
| 2003/0015185 A1 | 1/2003 | Dutart |
| 2017/0021302 A1 | 1/2017 | Galabraith et al. |

FOREIGN PATENT DOCUMENTS

| | | |
|---|---|---|
| EP | 2853306 B1 | 3/2016 |
| JP | 2006122562 A * | 5/2006 |

OTHER PUBLICATIONS

Jun Cai et al, Oxygen enrichment from Air using the Interception Effect of Gradient Magnetic Field on Oxygen Molecules:, Physics Letters A 362, pp. 105-108, 2007.

A. R. Smith and J. Klosek, "A review of Air Separation and their Integration with Energy Conversion Processes", Fuel Processing Technology 70, pp. 115-134, 2001.

* cited by examiner

OXYGEN ENRICHMENT OF ATMOSPHERIC AIR USING RELATIVE MOTION

CROSS-REFERENCE TO RELATED APPLICATIONS

This non-provisional U.S. patent application claims the benefit of the filing date under 35 USC 119(e) of U.S. provisional patent application No. 62/295,640 filed on Feb. 16, 2016, the teachings of which are incorporated herein by reference in their entirety.

TECHNICAL FIELD

The invention generally relates to oxygen enrichment of atmospheric air. More particularly but not exclusively, this invention relates to continuously providing an oxygen-enriched gas/air using a relative motion of selected surface(s) of the apparatus relative to an atmospheric air, e.g., for improving combustion, exhaust and related properties of the apparatus.

BACKGROUND OF THE INVENTION

It was recognized for many decades that using oxygen-enriched air in fossil-fueled combustion engines can lead to significant benefits, such as increasing in power output, improving fuel consumption (conversion efficiency) and thermal conversion efficiency, and reducing exhaust emissions of carbon monoxide and hydrocarbons. Substantial efforts have been aimed at improving engine efficiencies and decreasing emissions that pollute the environment, using, for example, permeable membranes, to provide the oxygen-enriched. Notwithstanding the advantages of introducing the oxygen-enriched air in various fossil-fueled combustion devices/systems, the lack of an economical source of on-line oxygen has made it difficult to provide a practical application of the concept of providing the oxygen-enriched air to corresponding engines/systems, at least during various phases or time periods of operation of the engine.

SUMMARY OF THE INVENTION

According to a first aspect of the invention, an apparatus, comprising: one or more surfaces configured, when are engaged in a relative motion with an atmospheric air comprising oxygen ($O_2$) and nitrogen ($N_2$), to form an oxygen-enriched gas/air layer along/near each surface of the one or more surfaces by pushing the atmospheric air along the one or more surfaces during the relative motion, where each of the one or more surfaces having an angle of a normal at any surface point with a direction of the relative motion to be above zero degrees (also the angle can be less than 90 degrees); and one or more collector gates, each located inside the apparatus adjacent to corresponding one of the one or more surfaces, each collector gate can be configured, when a speed of the relative motion exceeds a threshold value, to collect an oxygen-enriched gas/air, by pulling in, the formed oxygen-enriched gas/air layer, based on a higher external pressure built in a space near the corresponding surface of the one or more surfaces than an internal pressure in a corresponding space inside of the each collector gate. Further, the oxygen-enriched gas/air collected individually by the one or more collector gates may be combined, and the combined collected oxygen-enriched gas/air may be provided to a combustion chamber/area of an engine of the apparatus for optimizing a combustion process.

According further to the first aspect of the invention, each one or more collector gates may comprise a movable aperture/screen configured to adjust a portion/percentage of oxygen in the collected oxygen-enriched gas/air. Further, the movable aperture/screen can be configured to adjust an amount of the collected oxygen-enriched gas/air through the each gate. Still further, the apparatus can comprise a fossil-fuel burning vehicle containing an automobile, a motorcycle, a truck, an aircraft, a ship, a bus or a rocket, or a fossil-fuel burning apparatus containing a power generator, a power plant, a heater or a furnace. Still further, the apparatus can be a moving object through the atmospheric air with the speed exceeding the threshold value. Yet still further, the apparatus may be a stationary object and the atmospheric air can be moved/blown toward the one or more surfaces of the stationary object with the speed exceeding the threshold value in the direction of the relative motion.

According further to the first aspect of the invention, the apparatus can further comprise a duct system to provide/combine the oxygen-enriched gas/air collected by the one or more collector gates. Further, the apparatus can comprise multiple collector gates, and the duct system can comprise corresponding multiple branches for collecting the oxygen enriched gas/air from the multiple collector gates. Still further, each branch of the one or more branches can comprise a pressure relief valve to adjust an amount of the oxygen-enriched gas/air from each of the one or more gates and to keep the internal pressure in the corresponding space inside of the each collector gate below the external pressure built in a space near the corresponding surface of the apparatus. Moreover, the pressure relief valve can be adjustable depending on the speed of the relative motion.

Still further according to the first aspect of the invention, the duct system may comprise a controllable mixer configured to combine the oxygen-enriched gas/air collected by the one or more collector gates. Still further, the controllable mixer may be configured to vary an amount of the collected oxygen-enriched gas/air from any of the one or more collector gates being combined, in order to provide a desired portion of oxygen in the combined oxygen enriched gas/air.

According further to the first aspect of the invention, the apparatus can further comprise one or more oxygen content sensors, each oxygen content sensor may be configured to analyze an oxygen content of the oxygen-enriched gas/air collected by corresponding each of the one or more collector gates to provide a preliminary tuning of a desired portion of oxygen in the oxygen-enriched gas/air by adjusting a corresponding movable aperture/screen in the corresponding each collector gate.

According still further to the first aspect of the invention, the apparatus can further comprise a further oxygen content sensor for analyzing oxygen content of the combined oxygen-enriched gas/air collected by the one or more collector gates to provide a further preliminary tuning of a desired portion of oxygen in the combined oxygen-enriched gas/air, the further preliminary tuning can be provided by one or more of: a) adjusting an amount of the oxygen-enriched gas/air from all or selected collector gates of the one or more collector gates individually, and b) adjusting a corresponding movable aperture/screen in corresponding collector gates of the one or more collector gates for a desired portion/percentage of oxygen in the collected oxygen-enriched gas/air.

According yet further still to the first aspect of the invention, the apparatus can further comprise one or more exhaust sensors analyzing a composition of an exhaust gas/air from the combustion chamber for providing a feedback signal for fine tuning of the oxygen-enriched gas/air provided to combustion chamber to meet exhaust standards, the fine tuning may be provided by one or more of: a) adjusting an amount of the oxygen-enriched gas/air from all or selected of the one or more gates individually, and b) adjusting a corresponding movable aperture/screen in corresponding collector gates of the one or more collector gates for a desired portion/percentage of oxygen in the collected oxygen-enriched gas/air. Still further, the one or more exhaust sensors may comprise one or more of: a temperature sensor, a particulate sensor, a carbon oxide sensor, a carbon dioxide sensor, an oxygen sensor, a water sensor, a carbon monoxide sensor, and a nitrogen oxide sensor.

According to a second aspect of the invention, a method comprising: monitoring a speed of an apparatus engaged in a relative motion with an atmospheric air comprising oxygen ($O_2$) and nitrogen ($N_2$),), where one or more surfaces of the apparatus are configured to form an oxygen-enriched gas/air layer along/near each surface of the one or more surfaces by pushing the atmospheric air along the one or more surfaces during the relative motion, where each of the one or more surfaces having an angle of a normal at any surface point with a direction of the relative motion to be above zero degrees; and when the speed of the relative motion exceeds a threshold value, collecting an oxygen-enriched gas/air by each of one or more collector gates, each collector gate is located inside the apparatus adjacent to corresponding one of the one or more surfaces, and each collector gate is configured to collect, by pulling in, the formed oxygen-enriched gas/air layer, based on a higher external pressure built in a space near the corresponding surface of the one or more surfaces than an internal pressure in a corresponding space inside of the each collector gate.

According to a second aspect of the invention, the method may further comprise: combining the oxygen-enriched gas/air collected individually by the one or more collector gates; and providing the combined collected oxygen-enriched gas/air to a combustion chamber/area of an engine of the apparatus for optimizing a combustion process.

According further to the second aspect of the invention, the method may further comprise: varying, by a controllable mixer, an amount of the collected oxygen-enriched gas/air from each of the one or more collector gates being combined, in order to provide a desired portion of oxygen in the combined oxygen enriched gas/air.

According further to the second aspect of the invention, the method may further comprise: determining, by one or more oxygen content sensors, whether the oxygen-enriched gas/air, collected by corresponding each of the one or more collector gates, has a desired portion of oxygen; and tuning a desired portion of oxygen in the oxygen-enriched gas/air by adjusting a corresponding movable aperture/screen in the corresponding each collector gate.

According further still to the second aspect of the invention, the method may further comprise: determining, by a further oxygen content sensor, an oxygen content of a combined oxygen-enriched gas/air collected by the one or more collector gates; and providing a further preliminary tuning of a desired portion of oxygen in the combined oxygen-enriched gas/air by one or more of: a) adjusting an amount of the oxygen-enriched gas/air from all or selected collector gates of the one or more collector gates individually, and b) adjusting a corresponding movable aperture/screen in corresponding collector gates of the one or more collector gates for a desired portion/percentage of oxygen in the collected oxygen-enriched gas/air.

Further according to the second aspect of the invention, the method may further comprise: determining, by one or more exhaust sensors analyzing a composition of an exhaust gas/air from the combustion chamber; and providing a feedback signal for fine tuning of the oxygen-enriched gas/air provided to combustion chamber to meet exhaust standards, the fine tuning can be provided by one or more of: a) adjusting an amount of the oxygen-enriched gas/air from all or selected of the one or more gates individually, and b) adjusting a corresponding movable aperture/screen in corresponding collector gates of the one or more collector gates for a desired portion/percentage of oxygen in the collected oxygen-enriched gas/air.

BRIEF DESCRIPTION OF THE DRAWINGS

These and other features and aspects of the present disclosure will become better understood when the following detailed description is read, with reference to the accompanying drawings, in which like characters represent like parts throughout the drawings, wherein.

DETAILED DESCRIPTION

Figure 1:
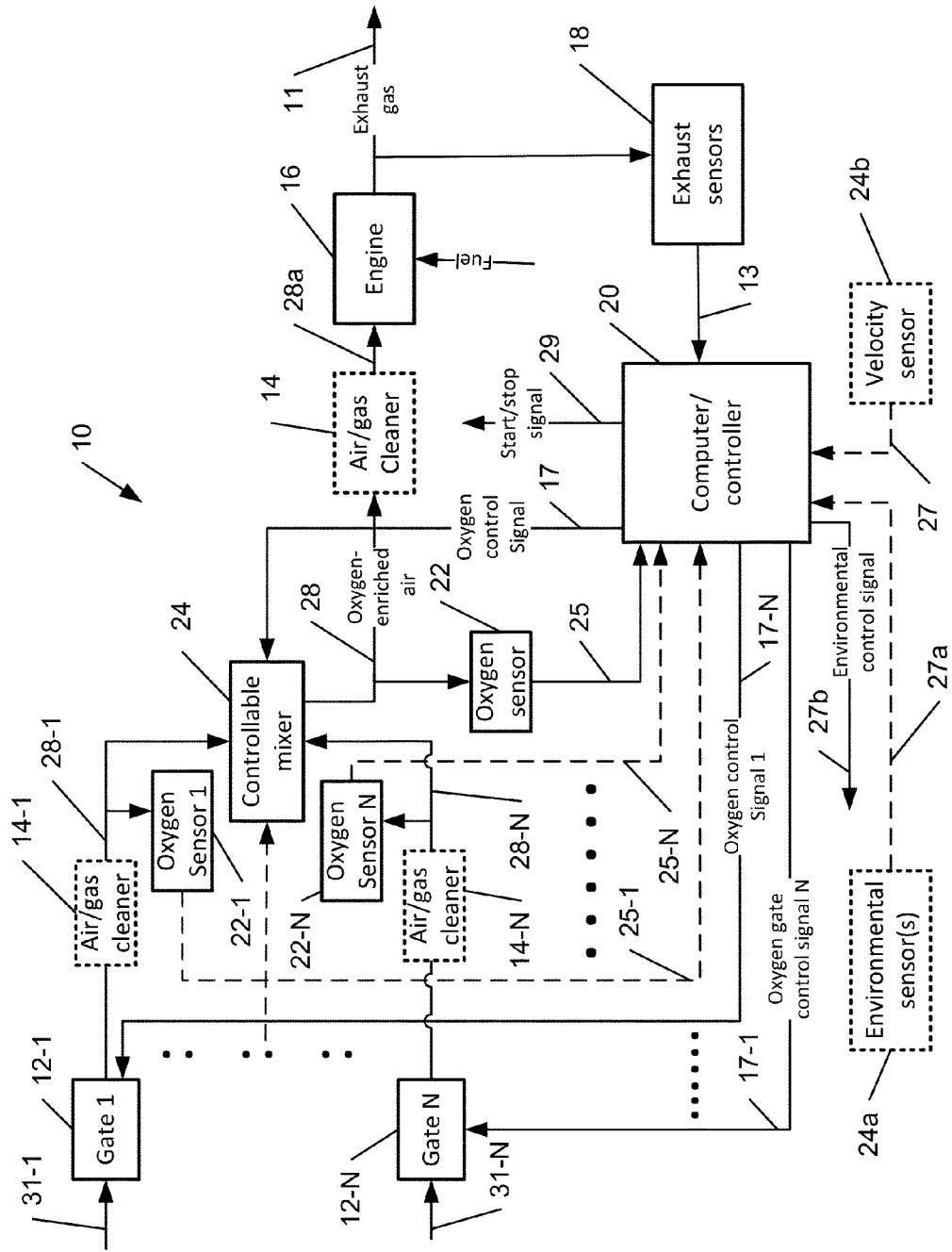
FIG. 1 is an exemplary block diagram of an apparatus/device for continuously providing an oxygen-enriched gas/air using a relative motion, according to various embodiments of the invention.

New apparatus and method are presented for continuously providing an oxygen-enriched gas/air using a relative motion of selected surface(s) of an apparatus (such as a fossil-fueled combustion device/vehicle) relative to an atmospheric air with a speed (or a relative speed) exceeding a threshold value for, e.g., improving combustion, exhaust and related properties of the apparatus. An oxygen-enriched gas/air layer can be formed along/near each aforementioned surface from the atmospheric air (normally atmospheric air comprises 78% nitrogen $N_2$ and 21% oxygen $O_2$) due to pushing the atmospheric air along the surface(s) during that relative motion and further collected by corresponding collector gate(s) located inside the apparatus near/adjacent to the corresponding surface. The apparatus can be an object (e.g., a vehicle) moving through the atmospheric air with a relative speed exceeding the threshold value. Alternatively, the apparatus can be a stationary object (e.g., a power generator) while the atmospheric air, having a desired speed exceeding the threshold value, is moved/blown toward the stationary object. The described methodology of generating the oxygen-enriched gas/air can be applied, besides the internal combustion, for variety of other applications (e.g., medical and the like) requiring a continuous source of the oxygen-enriched gas/air.

Continually providing oxygen-enriched gas/air may enable fossil fuels to burn more rapidly and completely, producing more power and lower emissions. This can have a widespread impact to a wide variety of industries, including (but not limited to) transportation, power production, defense, agriculture, construction, manufacturing, and heating. The potential applications may include various devices driven by combustion engines such as devices comprising combustion chambers or one or more combustion spaces. These devices may comprise fossil-fuel burning vehicles which can include automobiles (e.g., using windshield surfaces), motorcycles, trucks, buses, trains, aircrafts (e.g., using surfaces of wings, engine nose cones), ships, rockets (e.g., using surfaces of nose cones), construction and farming equipment, military tanks, and the like. Moreover, such devices may also be fossil-fuel burning apparatuses such as power generators, heaters, furnaces, as well as power plants, and the like. Appropriate windward surfaces in aforementioned devices can be used for implementing embodiments described herein.

According to an embodiment of the invention, an apparatus (e.g., a vehicle) can comprise one or more surfaces configured, when are engaged in a relative motion with an atmospheric air comprising oxygen ($O_2$) and nitrogen ($N_2$), to form an oxygen-enriched gas/air along/near each surface of the one or more surfaces from the atmospheric air by pushing the atmospheric air along the one or more surfaces during this relative motion. Each of the one or more surfaces can have an angle of a normal at any surface point with a direction of this relative motion above zero degrees, e.g., between 0 and 90 degrees, which can be appropriately designed and optimized based on anticipated (relative) speeds and their corresponding threshold values. Thus in case of the moving object (such as a vehicle), and/or a stationary object (such a power generator), the movement of the object and/or of the atmospheric air should be substantially along the direction of the relative motion as described herein.

It is further noted that according to this embodiment, the apparatus may be a moving object, but before reaching the threshold value of its speed, the atmospheric air can be moved/blown toward the one or more surfaces of the moving object artificially (e.g., using an additional fan), so that a total relative speed (vehicle plus atmospheric air speeds) can exceed the threshold value, to facilitate collection of the oxygen-enriched gas/air, as described herein. Then, when the speed of the moving object exceeds the threshold value, the artificial source for moving/blowing the atmospheric air can be turned off. For some applications, for example, the threshold value can be 30 miles per hour.

Moreover, according to the aforementioned embodiment, the apparatus can further comprise one or more collector gates, each located inside the apparatus adjacent to corresponding one of these one or more surfaces. Each collector gate can be configured to collect by pulling in the formed oxygen-enriched gas/air based on a higher external pressure built in a space near the corresponding surface of the one or more surfaces of the apparatus than an internal pressure in a corresponding space inside of the each collector gate. Then the collected oxygen-enriched gas/air from each of the one or more collector gates can be combined and provided to a specific application, e.g., to a combustion chamber/area of an engine of the apparatus for optimizing a combustion process.

According to another embodiment of the invention, each one or more collector gates can comprise a movable aperture/screen configured to adjust a portion/percentage of oxygen in the collected oxygen-enriched gas/air, as illustrated in FIGS. 6-9.

According to another embodiment of the invention, an apparatus can comprise a duct system to provide/combine the oxygen-enriched gas/air collected by the one or more collector gates. In case of multiple collector gates, the duct system can comprise multiple branches for collecting the oxygen enriched gas/air from the corresponding multiple collector gates.

Figure 11:
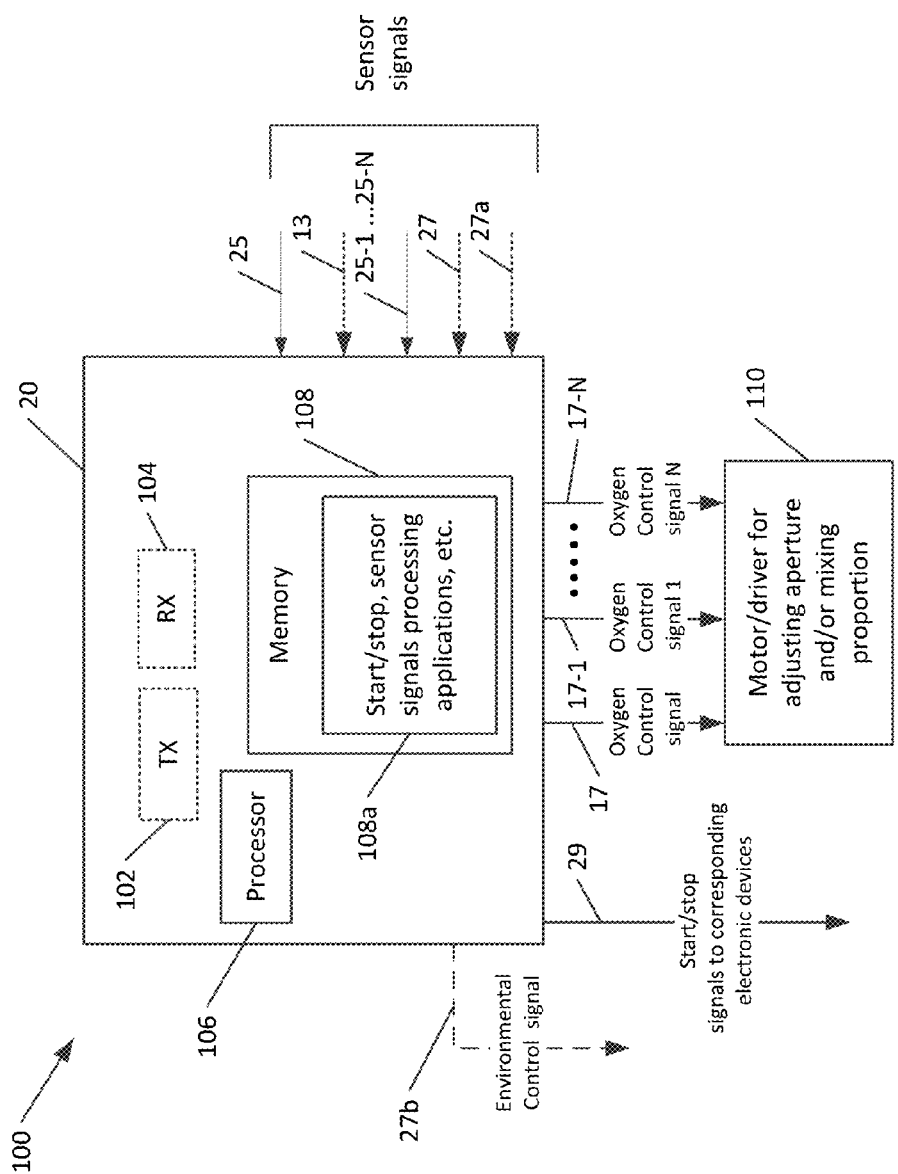
FIG. 11 is an exemplary block diagram of a computer/controller (shown in FIG. 1) demonstrating its operation within apparatus, according to various embodiments of the invention.

Moreover, each branch of the one or more branches of the duct system can comprise a pressure relief valve or the like (more generally a pressure regulating device) to adjust an amount of the provided oxygen-enriched gas from each of the one or more gates and to keep the internal pressure in the corresponding space inside of the each collector gate below the external pressure built in a space near the corresponding surface of the apparatus. The pressure relief valve or the like can be is adjustable, for example depending on speed of the vehicle, which can be regulated by a computer controller of the apparatus, as illustrated in FIGS. 1 and 11.

Furthermore, the duct system can comprise a controllable mixer configured to combine the collected oxygen-enriched gas/air by the one or more collector gates. This controllable mixer can be further configured to vary an amount of the collected oxygen-enriched gas/air from each or some of the one or more collector gates being combined, in order to provide a desired portion of oxygen in the combined oxygen enriched gas to the combustion chamber. Alternatively, if the controllable mixer is not used, this adjustment of the amount of the oxygen-enriched gas/air may be performed separately in each branch comprising the collector gate.

According to a further embodiment of the invention, the apparatus can comprise one or more oxygen content sensors for determining a portion/percentage of oxygen in the oxygen-enriched gas. Each oxygen content sensor can be configured to analyze an oxygen content of the oxygen-enriched gas/air collected by corresponding collector gates of the one or more collector gates to provide preliminary tuning of a desired portion/content (e.g., a desired a range) of oxygen in the oxygen-enriched gas/air by adjusting a corresponding movable aperture/screen (as illustrated in FIGS. 1, 4-11).

Figure 4A:
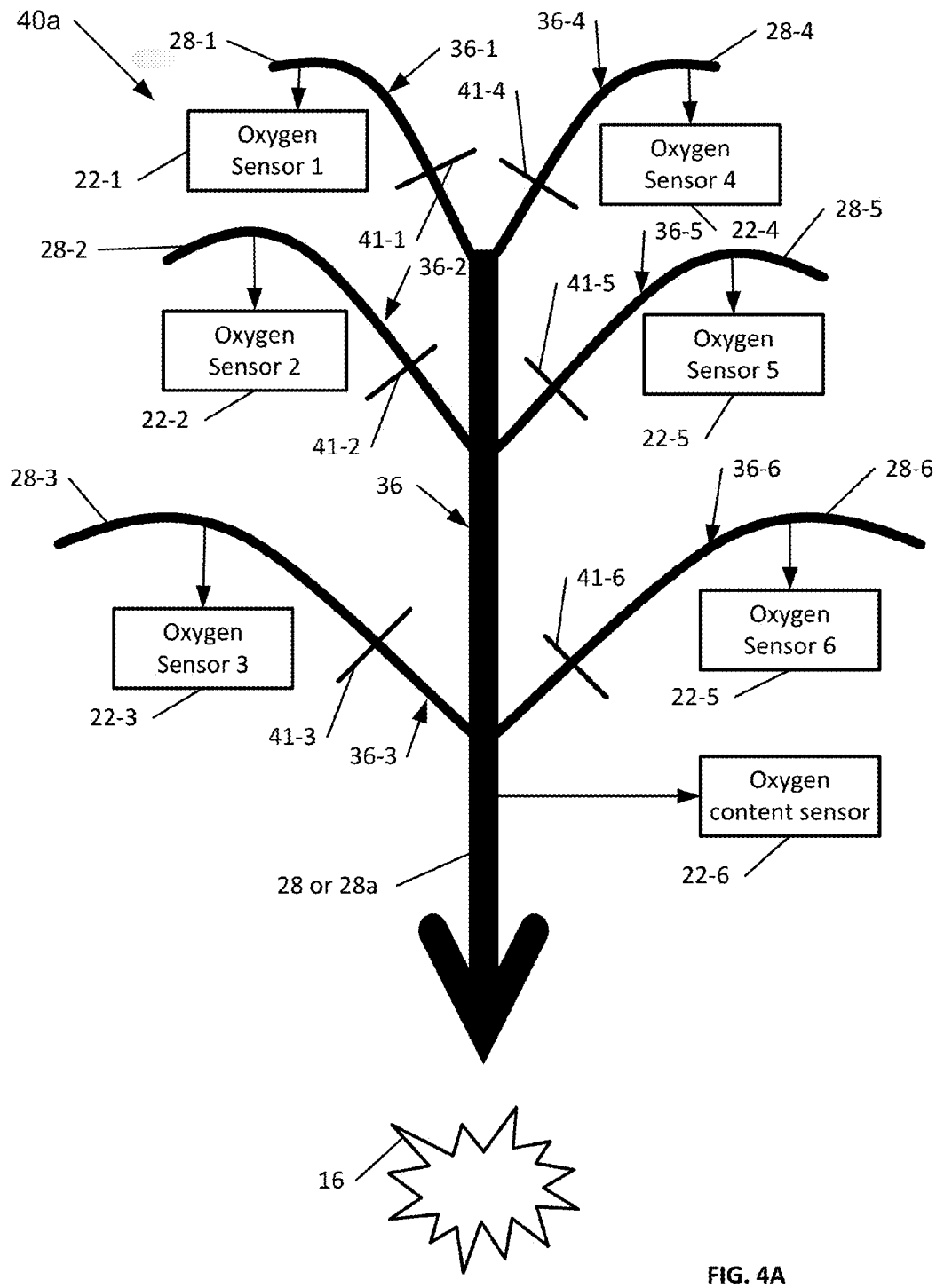
FIGS. 4A and 4b are exemplary views of collection systems comprising corresponding duct systems of the vehicle/rocket (apparatus) shown in FIG. 3, according to various embodiments of the invention.
Figure 4B:
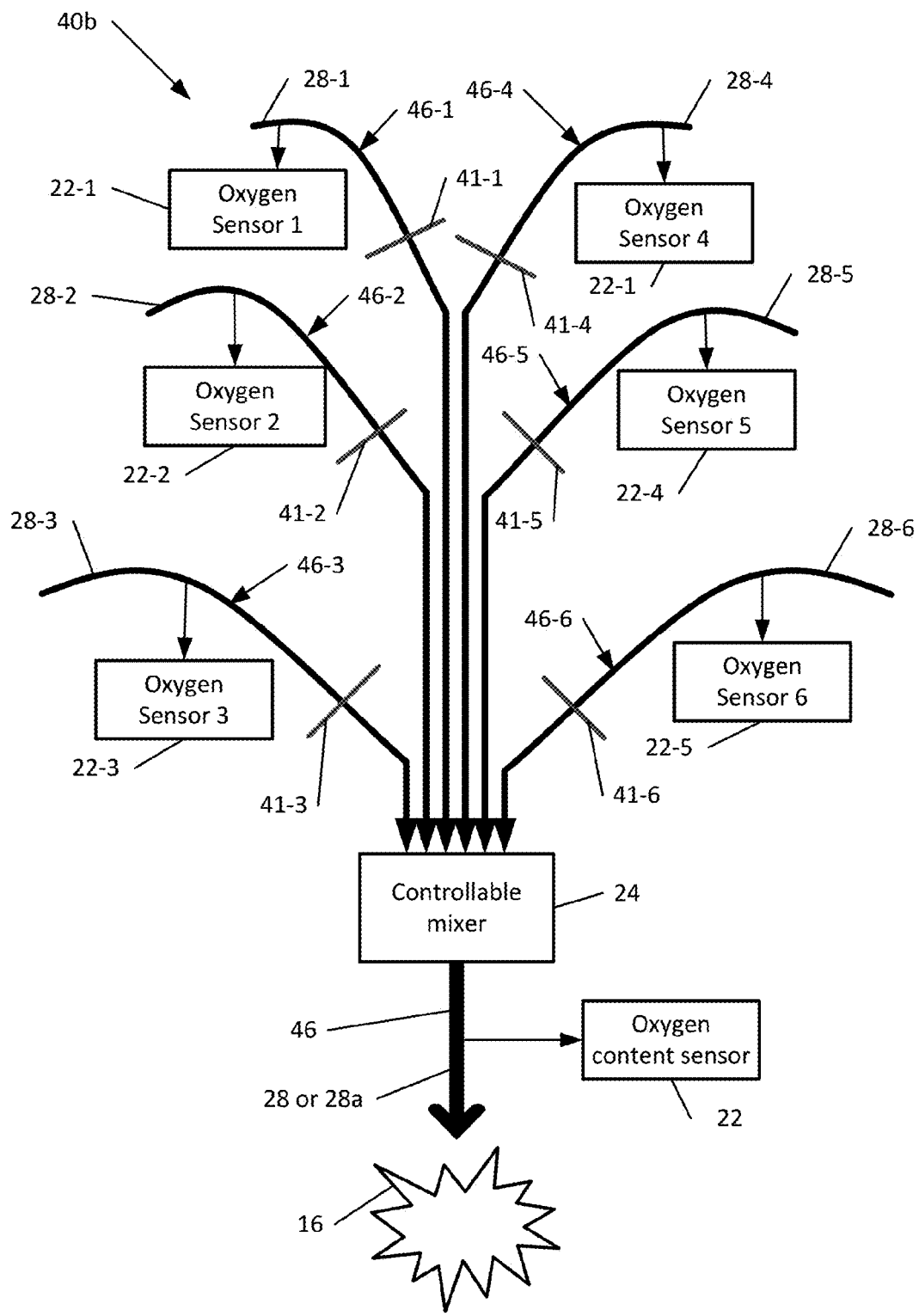

Moreover, the apparatus can comprise a further oxygen content sensor for analyzing oxygen content of the combined oxygen-enriched gas/air collected by the one or more collector gates to provide a further preliminary tuning of a desired portion of oxygen in the combined oxygen-enriched gas/air (see FIGS. 1, 4A-4B). The further preliminary tuning can be provided by: a) adjusting an amount of the oxygen-enriched gas from all or selected gates of the one or more collector gates individually, assuming that the oxygen content in the collected oxygen-enriched gas/air may be different (e.g., within a certain range) at different collector gates, and/or b) adjusting a corresponding movable aperture/screen in corresponding collector gates of the one or more collector gates for a desired portion/percentage/range of oxygen in the collected oxygen-enriched gas/air.

According to another embodiment of the invention, the apparatus can comprise one or more exhaust sensors analyzing a composition/oxygen content of an exhaust gas from the combustion chamber for providing a feedback signal for fine tuning of the oxygen-enriched gas/air provided to a combustion chamber to meet exhaust standards. The fine tuning can be provided by a) adjusting an amount of the oxygen-enriched gas from all or selected gates of the one or more collector gates individually, and/or b) adjusting a corresponding movable aperture/screen in corresponding collector gates of the one or more collector gates for a desired portion/percentage of oxygen in the collected oxygen-enriched gas/air. Moreover, the one or more exhaust sensors can comprise one or more of: a temperature sensor, a particulate sensor, a carbon oxide sensor, a carbon dioxide sensor, an oxygen sensor, a water sensor, a carbon monoxide sensor, and a nitrogen oxide sensor.

FIGS. 1-11 demonstrate non-limiting examples of various embodiments of the invention. It is noted that identical or similar parts/elements are designated using the same reference numbers in different figures.

FIG. 1 is an exemplary block diagram of an apparatus/device 10 comprising an engine 16 for continuously providing an oxygen-enriched gas/air 28/28a, according to various embodiments of the invention, to automatically improve combustion, exhaust and related properties of the apparatus 10. FIG. 1 is a simplified block diagram of the device 10 that is suitable for practicing the exemplary embodiments of this invention, e.g., in reference to FIGS. 3-11, and a specific manner in which components of the apparatus/device 10 can be configured to cause the device 10 to operate.

The apparatus 10 can move through an atmospheric air (normally atmospheric air comprises 78% nitrogen $N_2$ and 21% oxygen $O_2$), so that collector gates 12-1, . . . , and 12-N (N being a finite integer of one or more) may be able to collect the oxygen-enriched gas/air 31-1, . . . , and 31-N respectively, formed, as described above and explained in reference to FIGS. 2-3 and 5-9, along/near each aforementioned surface of the apparatus due to pushing the atmospheric air along that surface during that motion of the apparatus relative to the atmospheric air. The collected oxygen-enriched gas/air can be combined through a duct system and/or provided to a controllable mixer, which can adjust the individual amounts of oxygen-enriched gas/air collected by the collector gates 12-1, . . . , 12-N (as demonstrated in FIG. 4B). The combined oxygen-enriched gas/air 28/28a can be provided to the engine 16 (optionally through an air/gas filter 14) for combustion.

A computer/controller 20 (see FIG. 11 for more details) can be configured to generate a start/stop signal 29 to turn on and off signals when the apparatus speed crosses a threshold speed, i.e., "on" when the apparatus speed exceeds the threshold speed and "off" when the apparatus speed falls below the threshold speed. The apparatus speed can be monitored by a velocity sensor 24b and reported (signal 27) to the computer/controller 20 as shown in FIG. 1. Then, upon generating the start signal "on", the oxygen atmospheric gas/air 31-1, . . . , and 31-N can be pulled in by the corresponding collector gates 12-1, . . . , and 12-N as described herein.

According to a further embodiment, before providing the generated oxygen-enriched gas/air 28/28a to the engine 16 for combustion, it can be determined whether the oxygen-enriched gas/air 28 has a desired portion/content of oxygen, using at least one oxygen-content gas sensor 22. The readout 25 of the sensor 22 can be continuously provided to the computer/controller 20, which can make a determination using an appropriate program application, whether the oxygen-enriched gas/air 28 has the desired oxygen ($O_2$) content. If not, an oxygen control signal 17 can be provided to the controllable mixer 24 for adjusting the content of oxygen by varying the individual amounts of oxygen-enriched gas/air collected by the collector gates 12-1, . . . , and 12-N as described further in detail in reference to FIG. 4B.

According to another embodiment, the portion/content of oxygen can be determined for each collected oxygen-enriched gas/air 28-1, . . . , or 28N individually using oxygen sensors 22-1, . . . , and 22-N respectively as shown in FIG. 1. The readouts 25-1, . . . , and 25-N of the sensors 22-1, . . . , and 22-N can be continuously provided to the computer/controller 20. This data can be used by the computer/controller 20 for adjusting a portion/content of oxygen in the oxygen-enriched gas/air collected by the collector gates 12-1, . . . , and 12-N by sending corresponding signals 17-1, . . . , and 17-N to the corresponding gates 12-1, . . . , and 12-N (or corresponding motors/drivers) to individually adjust positions of corresponding apertures/screens (as demonstrated in FIGS. 6-9) to provide a desired portion/content (or being in a desired range) of the oxygen-enriched gas/air 28-1, . . . , or 28-N collected by the corresponding collector gate 12-1, . . . , or 12-N. In a further implementation, readouts 25-1, . . . , and 25-N of the sensors 22-1, . . . , and 22-N can be used (in addition to the readout signal 25) by the computer/controller 20 to generate the oxygen control signal 17 provided to the controllable mixer 24 for adjusting the content of oxygen by varying the individual amounts of oxygen-enriched gas/air collected by the collector gates 12-1, . . . , and 12-N as described further in detail in reference to FIG. 4B.

Moreover, after adjusting the oxygen content, the oxygen-enriched gas/air 28 may go through an air/gas cleaner 14, so that the cleaned oxygen-enriched gas/air 28a can be provided to a combustion chamber (place(s)) of the engine 16 as shown in FIG. 1. It is noted that air/gas cleaner(s), which is similar to the air cleaner 14, can be used instead or in addition elsewhere in the system, e.g., like air/gas cleaners 14-1, . . . , and 14-N directly cleaning the collected oxygen-enriched gas/air by the collector gates 12-1, . . . , 12-N.

It is further noted that environmental sensor(s) 24a can provide a further capability to clean the oxygen-enriched gas/air collected by the collector gates 12-1, . . . , and 12-N from excessive water, dust, debris and the like, before it enters the combustion chamber of the engine 16. The sensor readout 27a can be provided to the computer/controller 20 to generate a corresponding environmental activation signal 27a for activating additional air filter(s) if necessary (not shown in FIG. 1).

Furthermore, the engine 16 can facilitate the combustion process, using the (cleaned) oxygen-enriched gas/air 28/28a and a corresponding fuel, so that an exhaust gas 11 can be further analyzed by exhaust sensors 18. These sensors (which may include one or more of: a temperature sensor, a carbon oxide sensor, a carbon dioxide sensor, an oxygen sensor, a water sensor, a carbon monoxide sensor, a nitrogen oxide sensor and the like) can provide corresponding sensor readings 13 to the computer/controller 20. Then the computer/controller 20 can make a determination, using the appropriate program application(s), whether a further adjustment of the oxygen content in the oxygen-enriched gas/air 28/28a may be necessary. If this is the case, the computer/controller 20 can provide oxygen control signals 17 and/or 17-1, . . . , and/or 17-N to the controllable mixer 24 and/or to the collector gates 12-1, . . . , and/or 12-N respectively for performing necessary adjustments as described herein.

Figure 2:
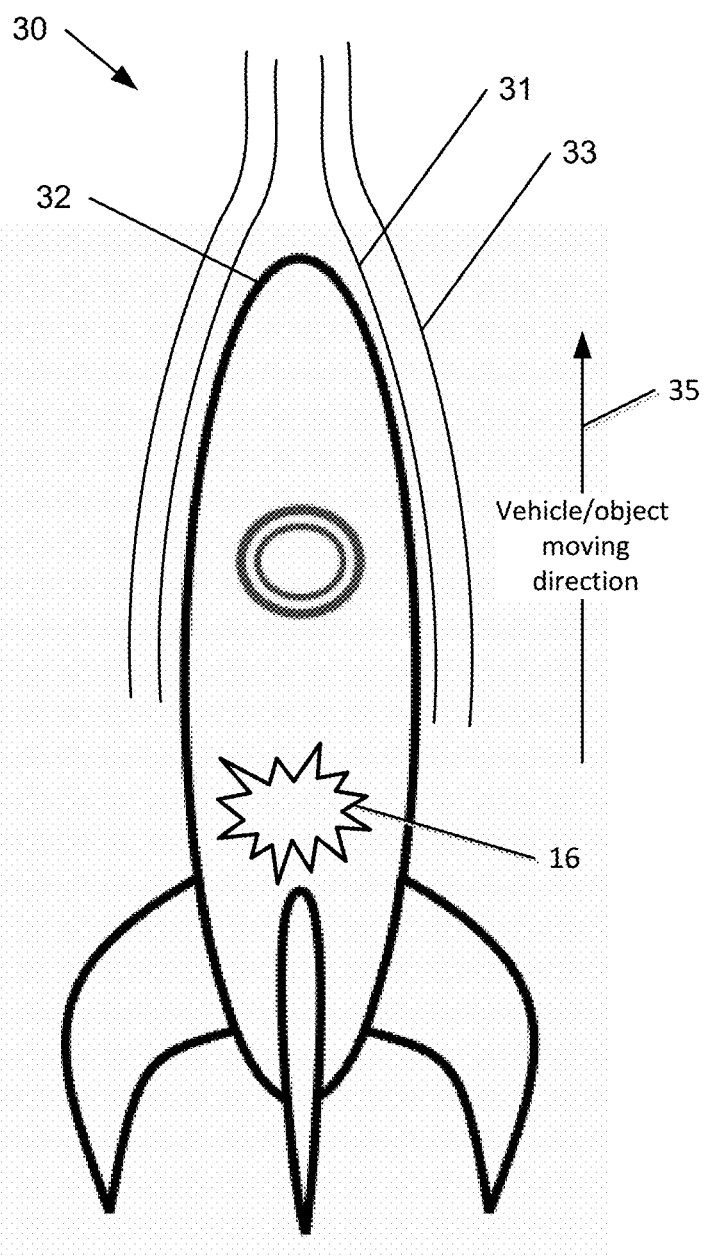
FIG. 2 is an exemplary view of an object (e.g., a rocket) moving through an atmospheric air.

FIG. 2 is an exemplary view of an object 30 (e.g., a rocket) having an engine 16 moving through an atmospheric air in a direction 35. As any vehicle moves rapidly through air, in this case a rocket, the force of the moving surface against the air can cause oxygen molecules to be collected near/along the pushing surface of a cone (cone are) 32 of a rocket 30, due to oxygen's higher density/mass/molecular weight compared to nitrogen. Therefore, the air layer 31 on that surface 32 can be oxygen-enriched, and the air layer 33 beyond that layer 31 may be oxygen-depleted (or nitrogen-enriched). This phenomenon can be explained by conservation of momentum, i.e., the heavier molecules of oxygen ($O_2$) pushed by the surface of the cone 32 (with the same force) can attain a slower speed than lighter molecules of nitrogen ($N_2$), which leads to a density/mass gradient, so that the oxygen molecules can concentrate more near (closer to) the surface 32 in the layer 31, whereas nitrogen molecules can concentrate more away from the surface 32 in the layer 33. It is further noted that a speed of the vehicle (rocket) 30 can be varied, thus changing a force applied to the oxygen and nitrogen gas molecules, thus altering the density/mass gradient distribution and therefore a spatial distribution of the layers 31 and 33. Based on these principles, collection of oxygen-enriched gas/air can be implemented as shown in FIG. 3.

Figure 3:
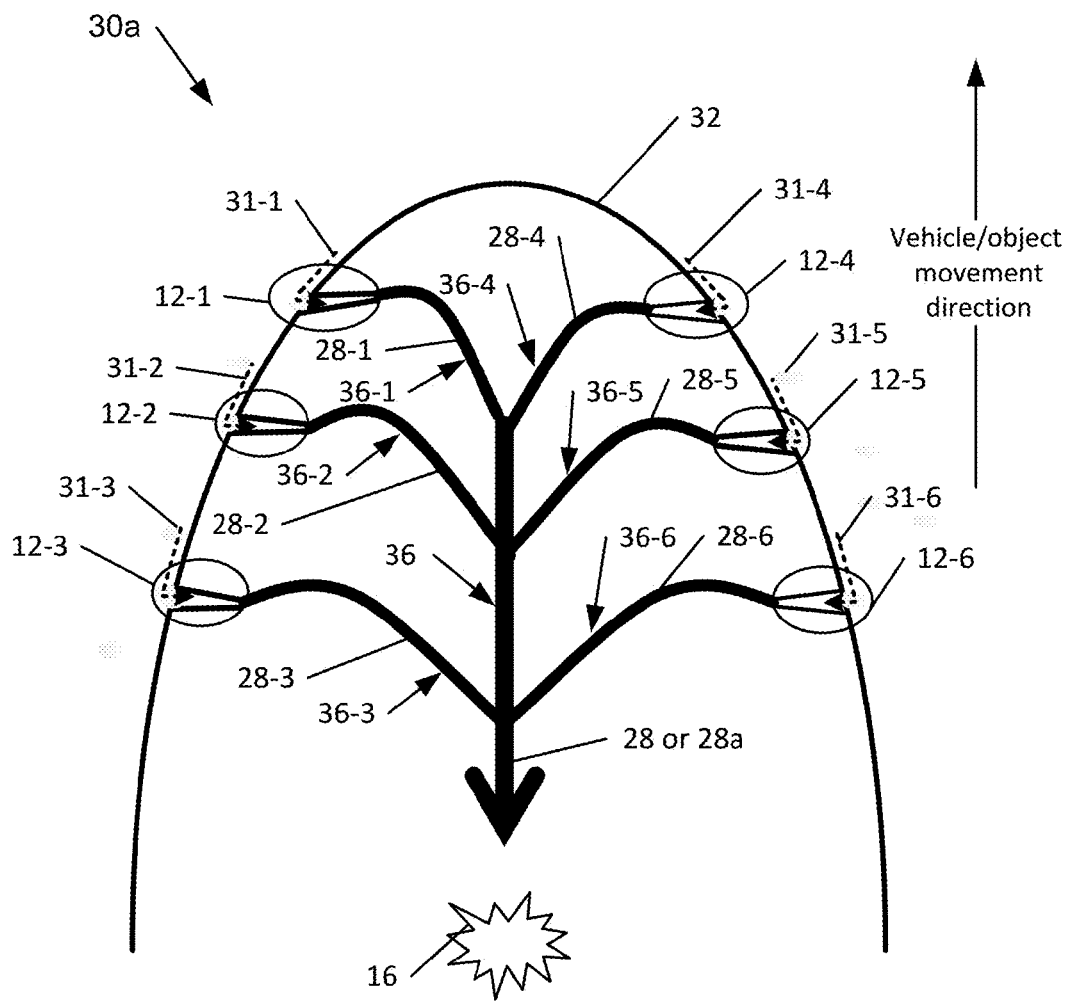
FIG. 3 is a cross-sectional exemplary view of a nose (cone) portion of the vehicle/rocket (apparatus), according to an embodiment of the invention.

FIG. 3 is a cross-sectional exemplary view of a nose (cone) portion 32 of the vehicle/rocket (apparatus) 30a, according to an embodiment of the invention. The apparatus/rocket 30a can further comprise collector gates 12-1, 12-2, . . . , and 12-6 in the nose (cone) portion 32, each collector gate located inside the apparatus adjacent to corresponding surfaces of the nose portion/are/.surface 32. Each collector gate can be configured to collect by pulling in the oxygen-enriched gas/air layers 31-1, 31-2, . . . , and 31-6 respectively, formed as explained in reference to FIG. 2. The pulling effect can be based on a slipping factor, i.e., tendency of the oxygen-enriched gas layer to follow a continuation of the surface 32 into a collector gate, and further based on a higher external pressure built in a space near the corresponding surface of the cone area 32 than an internal pressure maintained in a corresponding space inside of the each collector gate 12-1, 12-2, . . . , and 12-6. The shown shape of the collector gates 12-1, 12-2, . . . , and 12-6 is non-limiting and exemplary and can be designed/optimized based on requirements of a specific application. Then the collected oxygen-enriched gas/air 28-1, 28-2, and 28-6 from each of the one or more collector gates 12-1, 12-2, . . . , and 12-6 can be combined by a duct system, comprising collector branches 36-1, 36-2, . . . , and 36-6 and a combining branch 36 respectively, and further provided as a combined oxygen-enriched gas/air 28 or 28a (see FIG. 1) to a combustion chamber/area of an engine 16 of the apparatus/rocket 30a for optimizing a combustion process.

FIGS. 4A and 4b are exemplary views of corresponding collection systems 40a and 40b comprising respective duct systems of the vehicle/rocket (apparatus) 30a shown in FIG. 3, according to various embodiments of the invention. In FIG. 4A, the duct system comprises collector duct branches 36-1, 36-2, . . . , and 36-6 and a combining duct branch 36. Each collector branch 36-1, 36-2, . . . , or 36-6 can comprise a corresponding pressure relief valve 42-1, 41-2, . . . or 41-6, or the like (more generally a pressure regulating device) to adjust an amount of the provided oxygen-enriched gas from each of the collector gates 12-1, 12-2, . . . , or 12-6 and to keep the internal pressure in the corresponding space inside of the each collector gate below the external pressure built in a space near the corresponding surface of the moving apparatus/rocket 30a. It is further noted that in addition to or instead of the pressure relief valve, an additional pump can be used to more forcefully pull in the oxygen-enriched gas/air into corresponding gates 12-1, 12-2, . . . , and 12-6. The pressure relief valve (or the like) can be adjustable, for example, depending on speed of the vehicle, which can be regulated by a computer controller 20 of the apparatus 10, shown in FIGS. 1 and 11.

Furthermore, the collection system 40a in FIG. 4A (the same applies to the collection system 40b in FIG. 4B) can comprise oxygen content sensors 22-1, 22-2, . . . , and 22-6 for determining a portion/percentage of oxygen of the oxygen-enriched gas in the corresponding collector branches 36-1, 36-2, . . . , and 36-6. Each oxygen content sensor 22-1, 22-2, . . . , and 22-6 is configured to analyze an oxygen content of the oxygen-enriched gas/air collected by corresponding each of the one or more collector gates 12-1, 12-2, . . . , and 12-6 to provide preliminary tuning of a desired portion (e.g., being in predefined range) of oxygen in the oxygen-enriched gas/air by adjusting a corresponding movable aperture/screen in the corresponding each collector gate (as illustrated in FIGS. 1 and 4-11).

Moreover, the system 40a in FIG. 4A (the same applies to the collection system 40b in FIG. 4B) can comprise a further oxygen content sensor 22 for analyzing oxygen content of the combined oxygen-enriched gas/air collected in the combining branch 36 to provide a further preliminary tuning of a desired portion of oxygen in the combined oxygen-enriched gas/air. The further preliminary tuning can be provided by: a) adjusting individually an amount of the oxygen-enriched gas from all or selected gates of the collector gates 12-1, 12-2, . . . , and 12-6, e.g., using additional gas separators (not shown in FIG. 1 or 4A), and/or b) adjusting a corresponding movable aperture/screen in corresponding collector gates of the collector gates for a desired portion/percentage of oxygen in the collected oxygen-enriched gas/air in each of the corresponding collector gates 12-1, 12-2, . . . , and 12-6.

The collection systems 40b in FIG. 4B is similar to the collection systems 40a in FIG. 4A. In FIG. 4B, though, the duct system can comprise a combiner/controllable mixer 24 configured to directly combine the oxygen-enriched gas/air from collector duct branches 46-1, 46-1, . . . , and 46-6. The output 28 or 28a of the combiner/controllable mixer 24 can be provided to the engine 16 through a combining duct branch 46. This controllable mixer 24 can be configured to vary (using the oxygen control signal 17 from the compute/controller 20, see FIG. 1) an amount of the collected oxygen-enriched gas/air from any collector gates, in order to provide a desired portion of oxygen in the combined oxygen enriched gas 28/28a provided to a combustion chamber of the engine 16, using the oxygen portion/content of oxygen measured by the oxygen content sensor 22-1, 22-2, . . . , and 22-6 (as further explained in FIGS. 1, 10 and 11).

Figure 5:
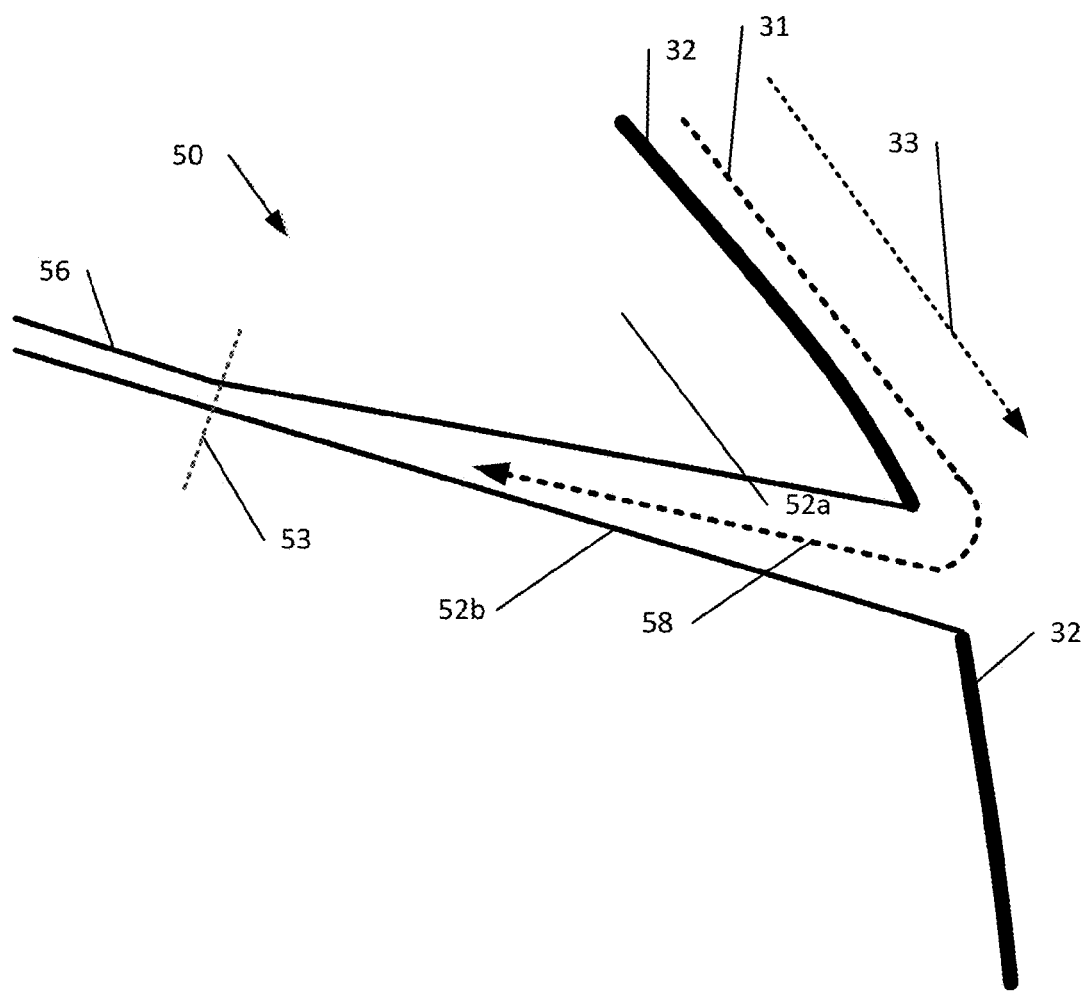
FIG. 5 is an exemplary cross-sectional view of a collector gate without an adjustable aperture/screen, according to an embodiment of the invention.

FIGS. 5-9 (5, 6A-6B, 7A-7B, 8A-8B and 9A-9B) are exemplary views of a collector gate without (FIG. 5) and with an adjustable aperture/screen (FIGS. 6A-6B, 7A-7B, 8A-8B and 9A-9B) to vary a portion/percentage of oxygen in the oxygen-enriched gas/air collected by a collector gate. FIG. 5 shows a view of an exemplary collector gate system, the collector gate being defined by surfaces 52a and 52b (the collector gate may have a cross-section in a form of a circle, an ellipse, a rectangle and the like) and collecting an oxygen-enriched gas/air 58 from the an oxygen-enriched gas/air 31 formed on a surface 32 of an apparatus, as explained herein, and then passing the collected oxygen-enriched gas/air 58 to a duct (tube/pipe) 56. A line 53 separates the collector gate from a duct tube/pipe 56.

FIGS. 6A-6B, 7A-7B, 8A-8B and 9A-9B are non-limiting exemplary views of a collector gate comprising an adjustable aperture/screen to vary a portion/percentage of oxygen in the oxygen-enriched gas/air collected by a collector gate. An optimum design of the adjustable aperture/screen can be optimized based on application requirements.

Figure 6A:
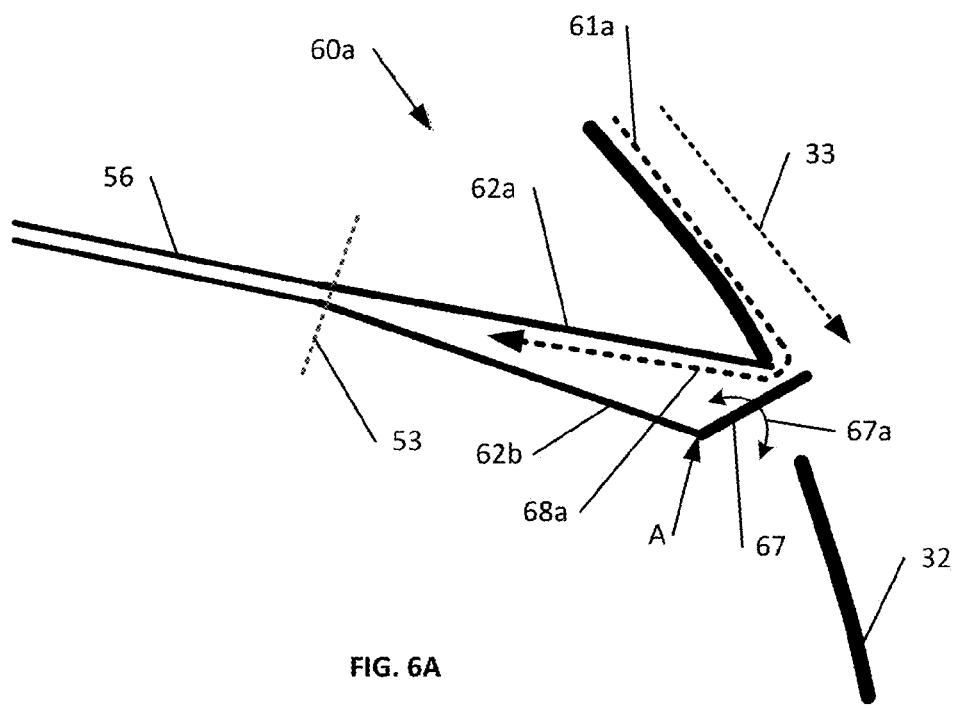
FIGS. 6A-6B are exemplary views of a collector gate with an adjustable aperture/screen, according to an embodiment of the invention.
Figure 6B:
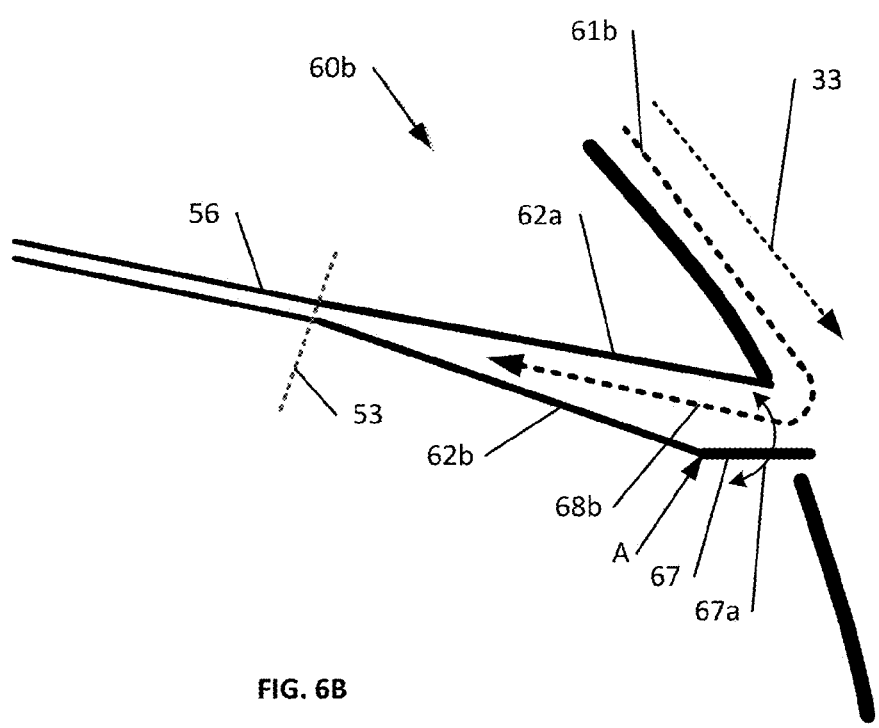

In FIGS. 6A and 6B, an aperture/screen 67 is configured to move in a rotation direction 67a and attached to a surface 62b at a point A, where the collector gate being defined by surfaces 62a and 62b. As shown in FIG. 6A, the position of the aperture/screen 67 can increase an oxygen content/portion of the oxygen-enriched gas/air layer 61a entering the collector gate, because only this layer, being the closest to the apparatus surface 32 and, therefore, having a higher portion of oxygen, can enter the collector gate as an oxygen-enriched gas/air 68a. In contrast, as shown in FIG. 6B, the position of the aperture/screen 67 can substantially decrease an oxygen content/portion of the oxygen-enriched gas/air layer 61b entering the collector gate, because this layer is a much larger (thicker) layer than the layer 61a and, therefore, having a lower portion of oxygen, and can enter the collector gate as an oxygen-enriched gas/air 68b.

Figure 7A:
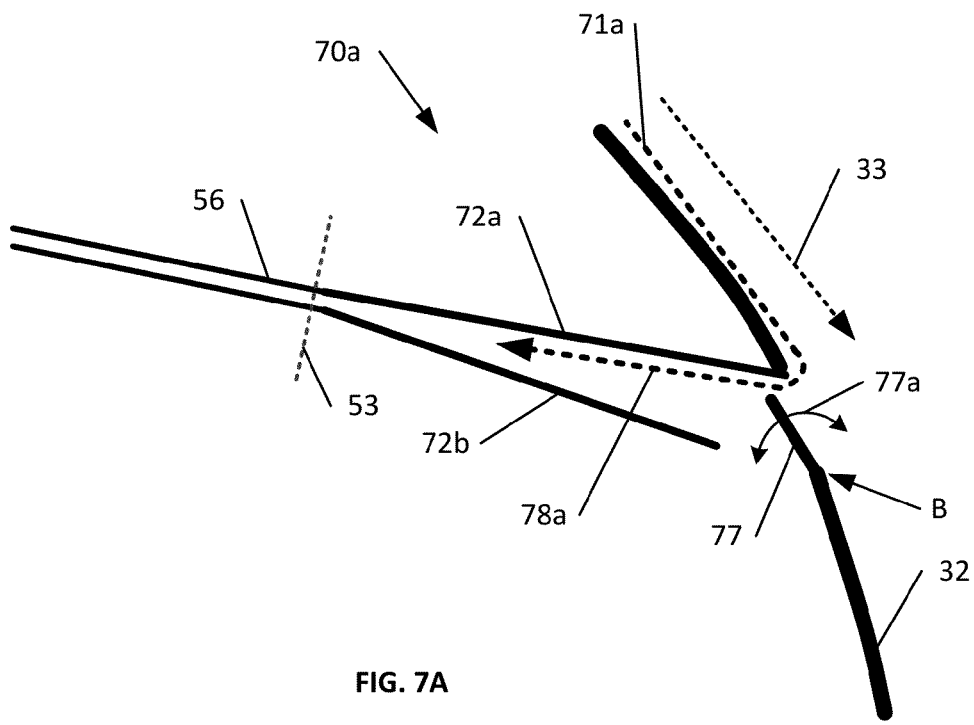
FIGS. 7A-7B are exemplary views of a collector gate with an adjustable aperture/screen, according to another embodiment of the invention.
Figure 7B:
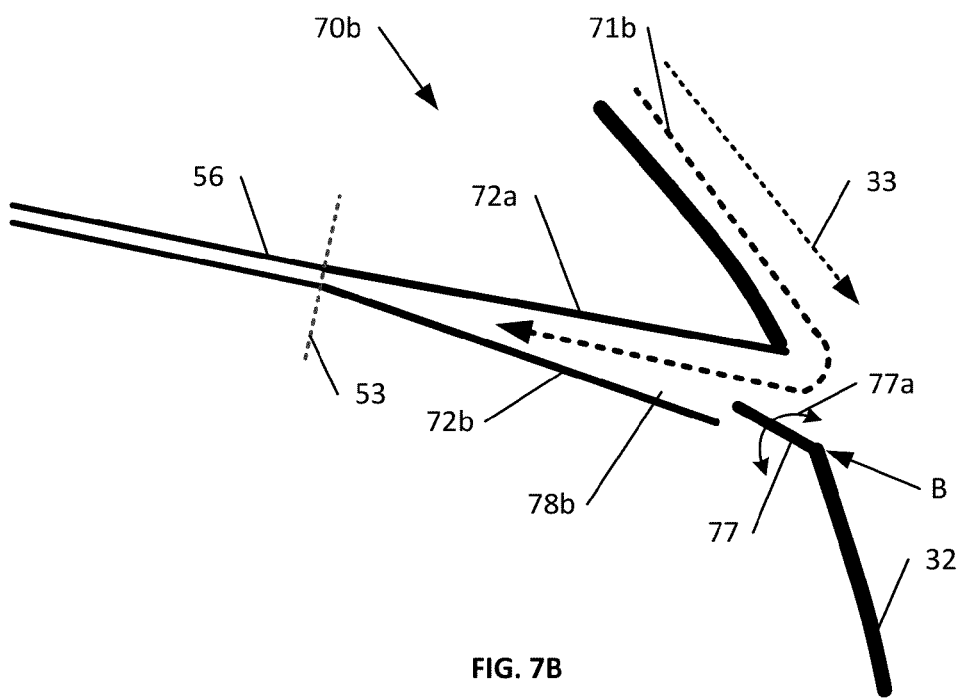

In FIGS. 7A and 7B, an aperture/screen 77 is configured to move in a rotation direction 77a and attached to a surface 32 at a point B, where the collector gate being defined by surfaces 72a and 72b. As shown in FIG. 7A, the position of the aperture/screen 77 can increase an oxygen content/portion of the oxygen-enriched gas/air layer 71a entering the collector gate, because only this layer, being the closest to the apparatus surface 32 and, therefore, having a higher portion of oxygen, can enter the collector gate as an oxygen-enriched gas/air 78a. In contrast, as shown in FIG. 7B, the position of the aperture/screen 77 can substantially decrease an oxygen content/portion of the oxygen-enriched gas/air layer 71b entering the collector gate, because this layer is a much larger (thicker) layer than the layer 71a and, therefore, having a lower portion of oxygen, and can enter the collector gate as an oxygen-enriched gas/air 78b.

Figure 8A:
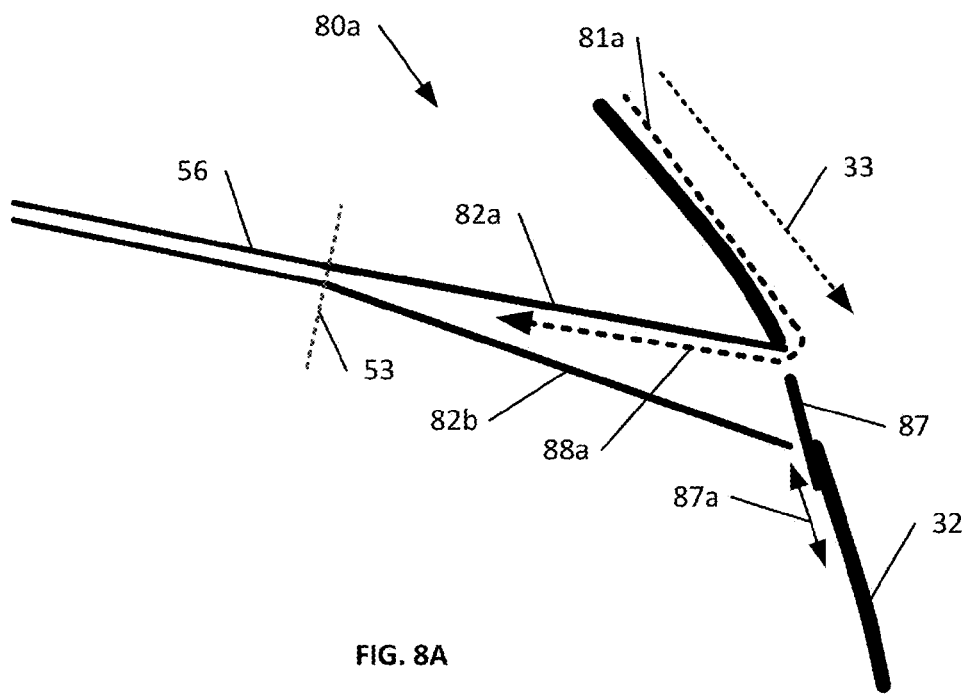
FIGS. 8A-8B are exemplary views of a collector gate with an adjustable aperture/screen, according to a further embodiment of the invention.
Figure 8B:
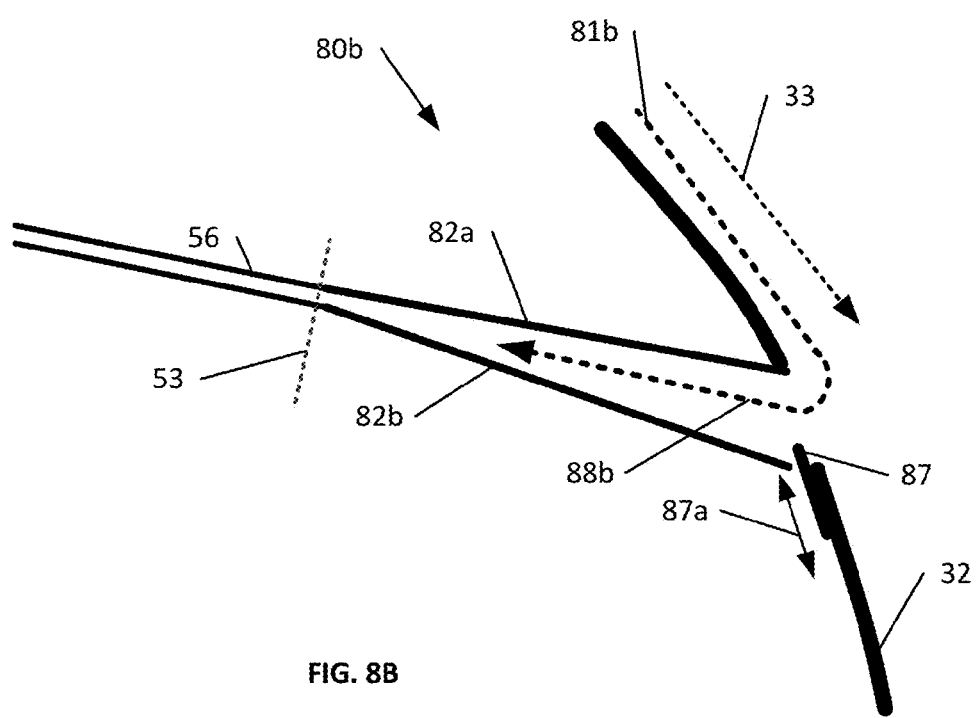

In FIGS. 8A and 8B, an aperture/screen 87 is configured to move in a linear direction 87a along a surface 32 B, where the collector gate being defined by surfaces 82a and 82b. As shown in FIG. 8A, the position of the aperture/screen 87 can increase an oxygen content/portion of the oxygen-enriched gas/air layer 81a entering the collector gate, because only this layer, being the closest to the apparatus surface 32 and, therefore, having a higher portion of oxygen, can enter the collector gate as an oxygen-enriched gas/air 88a. In contrast, as shown in FIG. 8B, the position of the aperture/screen 87 can substantially decrease an oxygen content/portion of the oxygen-enriched gas/air layer 81b entering the collector gate, because this layer is a much larger (thicker) layer than the layer 81a and, therefore, having a lower portion of oxygen, and can enter the collector gate as an oxygen-enriched gas/air 88b.

Figure 9A:
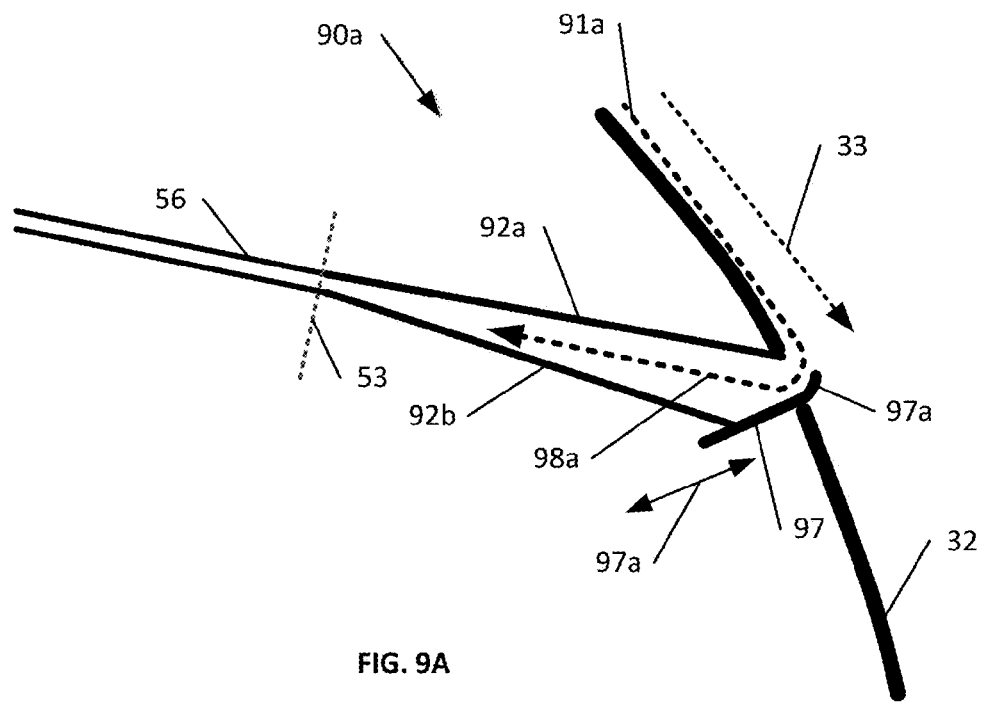
FIGS. 9A-9B are exemplary views of a collector gate with an adjustable aperture/screen, according to a still further embodiment of the invention.
Figure 9B:
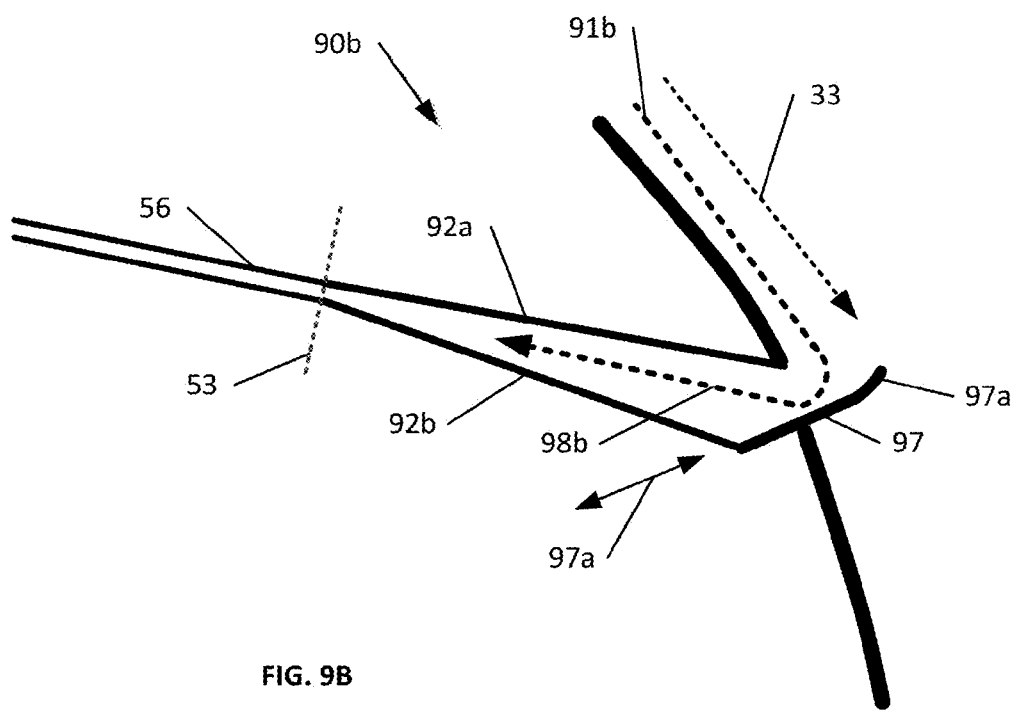

In FIGS. 9A and 9B, an aperture/screen 97 having a hook 97a is configured to move in a linear direction 97a, where the collector gate being defined by surfaces 92a and 92b. As shown in FIG. 9A, the position of the aperture/screen 97 can increase an oxygen content/portion of the oxygen-enriched gas/air layer 91a entering the collector gate, because only this layer, being the closest to the apparatus surface 32 and, therefore, having a higher portion of oxygen, can enter the collector gate as an oxygen-enriched gas/air 98a. In addition, the hook 97a can further increase the portion/content of the oxygen in the oxygen-enriched gas/air 98a compared to the corresponding portion/content of the oxygen in the oxygen-enriched gas/air 68a, 78a and 88a shown in FIGS. 6A, 7A and 8A. As shown in FIG. 9B, the position of the aperture/screen 97 can substantially decrease an oxygen content/portion of the oxygen-enriched gas/air layer 81b entering the collector gate, because this layer is a much larger (thicker) layer than the layer 91a and, therefore, having a lower portion of oxygen, and can enter the collector gate as an oxygen-enriched gas/air 98b.

Figure 10:
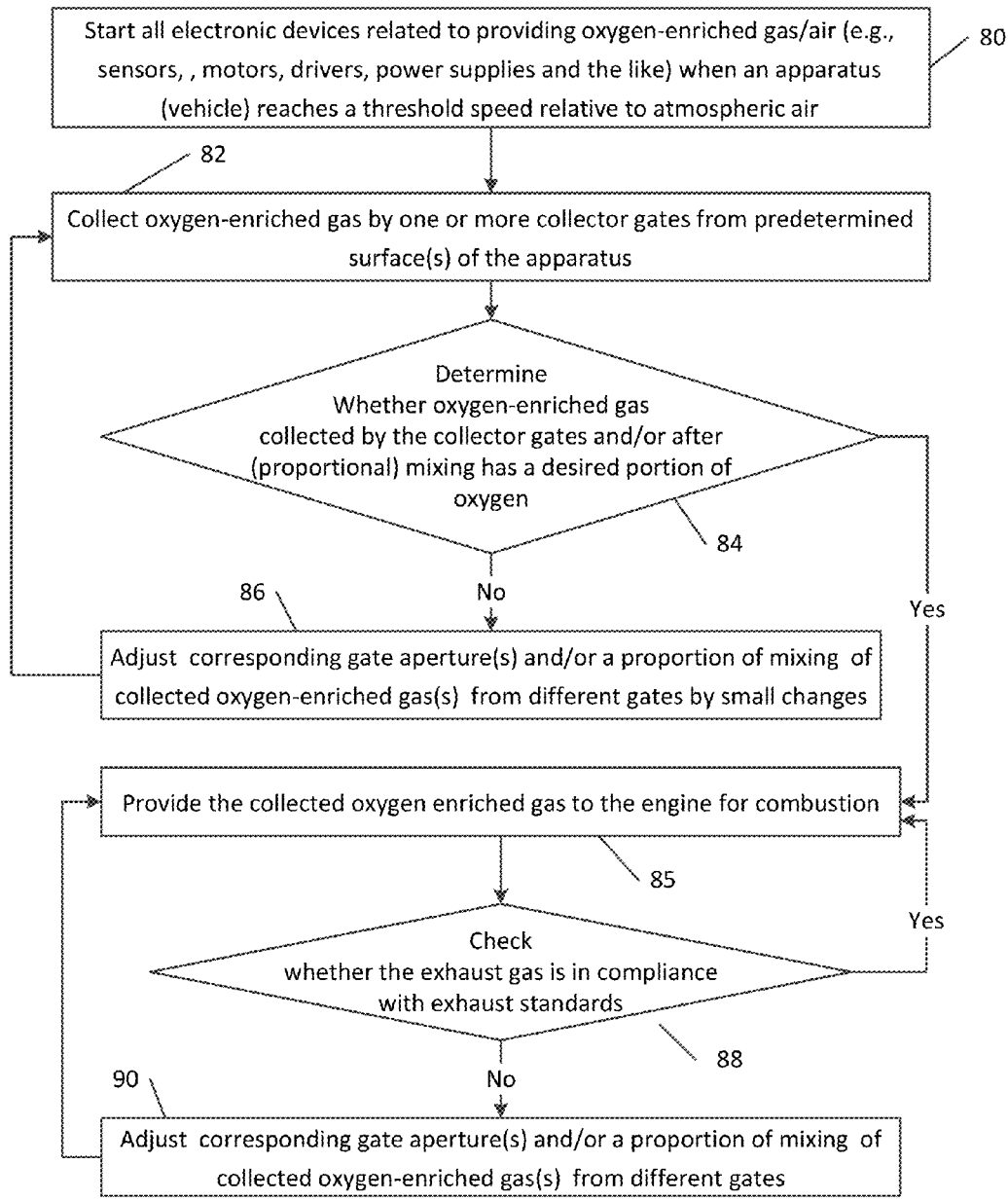
FIG. 10 is an exemplary flowchart for implementation of various embodiments of the invention.

FIG. 10 is an exemplary flowchart for implementation of embodiments, which are disclosed herein. It is noted that the order of steps shown in FIG. 10 is not required, so in principle, the various steps may be performed out of the illustrated order. Also certain steps may be skipped, different steps may be added or substituted, or selected steps or groups of steps may be performed in a separate application, following the embodiments described herein.

In a method according to this exemplary embodiment, as shown in FIG. 10, in a first step 80, a computer/controller (comprising at least one processor and a memory) of an apparatus can provide a start signal in order to start all electronic devices related to providing oxygen-enriched gas/air (e.g., sensors, motors, drivers, power supplies and the like) when the apparatus (e.g., a vehicle) reaches a threshold speed (relative to an atmospheric air).

In a next step 82, an oxygen-enriched gas/air is collected by one or more collector gates from predetermined surface(s) of the apparatus/vehicle. Then in a next step 84, it is determined whether the oxygen-enriched gas collected by the one or more collector gates and/or after combining/mixing (e.g., using proportional mixing by a controllable mixer 24 in FIG. 1) has the desired portion of oxygen, using, for example, readings of the oxygen sensors 22, 22-1, . . . and 22-N depicted in FIG. 1. If it is determined that the collected oxygen-enriched gas does have the desired portion of oxygen, the process can go to step 85.

However, if it is determined that the collected oxygen-enriched gas does not have the desired portion/content of oxygen (e.g., in a predefined range), in a next step 86, adjustment can be made of corresponding gate aperture(s) (see examples in FIGS. 6A-6B, 7A-7B, 8A-8B and 9A-9B) and/or of a proportion of mixing of collected oxygen-enriched gas(s) from different gates, e.g. using the controllable mixer 24 (as shown in FIGS. 1 and 4B). After the corresponding adjustments, the process can go back to step 82, and steps 82, 84 and 86 can be repeated until it is determined in step 84 that the collected oxygen-enriched gas does have the desired portion of oxygen and the process goes to step 85.

In step 85, the collected oxygen-enriched gas is provided to an engine for combustion (i.e., to a combustion chamber or combustion place(s)). In a next step 88, it can be determined whether the exhaust gas is in compliance with exhaust standards, where the exhaust gas parameters are measured by the exhaust sensors, as described herein, so that the readout of the measurement is provided to the computer/controller for determination. If it is determined that the exhaust gas is in compliance with the exhaust standards, the process can go to step 85 to continue a normal operation of the apparatus. However, if it is determined that the exhaust gas is not in compliance with the exhaust standards, in a next step 90, adjustment can be made of corresponding gate aperture(s) (see examples in FIGS. 6A-6B, 7A-7B, 8A-8B and 9A-9B) and/or of a proportion of mixing of collected oxygen-enriched gas(s) from different gates, e.g. using the controllable mixer 24 as described herein.

FIG. 11 is an exemplary block diagram 100 of a computer/controller 20 (shown in FIG. 1) demonstrating its operation within apparatus 10. FIG. 11 is a simplified block diagram of the computer/controller 20 that is suitable for practicing the exemplary embodiments of this invention, e.g., in reference to FIGS. 1 and 3-10, and a specific manner in which components of the computer/controller 20 are configured to cause the device 10 to operate.

The computer/controller 20 may comprise, e.g., at least one processor (controller) 106, and at least one memory 108 including applications 108a such as a start/stop application, a sensor signals processing application, a control signal application, and the like. The computer/controller 20 may further comprise a transmitter 102 and a receiver 104, which may be configured to transmit and receive signals (wirelessly or using a wired connection). The received signals may comprise any of the signals 25, 25-1, . . . , and 25-N, 13, 27 and 27a from various sensors, as described herein in reference to FIGS. 1, 3-4 and 10, so that the received signals are provided to corresponding applications 108a. The transmitted signals may comprise processing/control signals generated by the applications 108a, based on the received signals, for implementing various algorithms disclosed herein, such as shown in FIGS. 1 and 3-10. For example, a signal 29 can be directed to corresponding electronic modules/devices to start/stop when the apparatus (e.g., a vehicle) crosses a speed threshold value. Signals 17 and 17-1, . . . , 17-N (see FIG. 1) may be directed to corresponding motors/drivers 110, for providing, e.g., adjustment of corresponding gate aperture(s) (see examples in FIGS. 6A-6B, 7A-7B, 8A-8B and 9A-9B) and/or of a proportion of mixing of the collected oxygen-enriched gas(s) from different gates, e.g. using the controllable mixer 24 (see FIGS. 1 and 4B).

Various embodiments for the at least one memory 108 (e.g., computer readable memory) may include any data storage technology type which is suitable to the local technical environment, including but not limited to: semiconductor based memory devices, magnetic memory devices and systems, optical memory devices and systems, fixed memory, removable memory, disc memory, flash memory, DRAM, SRAM, EEPROM and the like. Various embodiments of the processor 106 include but are not limited to: general purpose computers, special purpose computers, microprocessors, digital signal processors (DSPs), multi-core processors, embedded, and System on Chip (SoC) devices.

The application module 108a may be implemented as one or more application computer programs stored in the memory 108, but in general it may be implemented as software, firmware and/or a hardware module, or a combination thereof. In particular, in the case of software or firmware, one embodiment may be implemented using a software related product such as a computer readable memory (e.g., non-transitory computer readable memory), computer readable medium or a computer readable storage structure comprising computer readable instructions (e.g., program instructions) using a computer program code (i.e., the software or firmware) thereon to be executed by a computer processor.

According to further embodiments of the invention, air collectors could be made from metals, plastics, ceramics, fiberglass, or other materials. Tubing (e.g., for a duct system) could be made of any material from copper to rubber, since it conducts a lower pressure atmospheric gas/air.

Moreover, the continuous oxygen enriching can result in more rapid firing and higher burn efficiency. The oxygen mix can be controlled so as not to deteriorate engine components. To take full advantage of the oxygen-enriched air, certain engine components may have to be made of materials such as ceramic materials, which can withstand high temperatures.

Furthermore, in comparison to engines that use normal or compressed air, continuous oxygen air enrichers may enable engines to burn any fossil fuels at accelerated rate, on demand, in order to: produce greater power and accelerated burn rate, and produce equivalent results with less fuel. The continuous oxygen enricher can enable vehicle manufacturers and owners to: increase engine performance, even for existing vehicles; reduce future engine size and weight; increase fuel efficiency and mileage; and reduce emissions of carbon monoxide and unburned carbon.

The potential use of the novel technology described herein may include (but may not be limited to) the following:

Any motor vehicle that runs on land, water, or rails that has an engine that burns fossil fuel, benefits: increased power, fuel efficiency, and lower emissions of carbon monoxide, and particulate matter;

Aircraft, including those driven with jet engines, helicopter engines, propeller engines, turboprops, or rocket engines, benefits: increased power, fuel efficiency, and lower emissions of carbon monoxide, and particulate matter, shorter and quicker takeoffs with shorter runways, ability to fly higher;

Furnaces, including those used for building and home heating, generating power, and manufacturing, benefits: increased fuel efficiency, lower emissions of carbon monoxide, and particulate matter;

Hospitals and medical facilities: ability to continuously generate oxygen-enriched air from a central source to patient rooms, operating rooms, emergency rooms, etc.;

Respiratory treatment: portable enriched oxygen generators that replace oxygen tanks;

Scuba systems: enriched oxygen can lead to longer dive times with equipment that normally contains atmospheric air;

Fuel combustion safety: enriched oxygen can lead to the use of fuels that only burn in enriched oxygen environments; these fuels would not ignite or explode in regular atmospheric air, for instance, during automobile or plane crashes or during plane fuel leaks or service station fuel leaks;

Unless defined otherwise, technical and scientific terms used herein have the same meaning as is commonly understood by one having ordinary skill in the art to which this disclosure belongs. The terms "first", "second", and the like, as used herein, do not denote any order, quantity, or importance, but rather are employed to distinguish one element from another. Also, the terms "a" and "an" do not denote a limitation of quantity, but rather denote the presence of at least one of the referenced items. The use of "including," "comprising" or "having" and variations thereof herein are meant to encompass the items listed thereafter and equivalents thereof, as well as additional items. The terms "connected" and "coupled" are not restricted to physical or mechanical connections or couplings, and can include electrical and optical connections or couplings, whether direct or indirect.

Furthermore, the skilled artisan will recognize the interchangeability of various features from different embodiments. The various features described, as well as other known equivalents for each feature, can be mixed and matched by one of ordinary skill in this art, to construct additional systems and techniques in accordance with principles of this disclosure.

In describing alternate embodiments of the apparatus claimed, specific terminology is employed for the sake of clarity. The invention, however, is not intended to be limited to the specific terminology so selected. Thus, it is to be understood that each specific element includes all technical equivalents that operate in a similar manner to accomplish similar functions.

It is to be understood that the foregoing description is intended to illustrate and not to limit the scope of the invention, which is defined by the scope of the appended claims. Other embodiments are within the scope of the following claims.

It is noted that various non-limiting embodiments described and claimed herein may be used separately, combined or selectively combined for specific applications. Further, some of the various features of the above non-limiting embodiments may be used to advantage, without the corresponding use of other described features. The foregoing description should therefore be considered as merely illustrative of the principles, teachings and exemplary embodiments of this invention, and not in limitation thereof.

What is claimed is:

1. An apparatus, comprising:
   one or more surfaces configured, when are engaged in a relative motion with an atmospheric air comprising oxygen ($O_2$) and nitrogen ($N_2$), to form an oxygen-enriched gas/air layer along/near each surface of the one or more surfaces by pushing the atmospheric air along the one or more surfaces during said relative motion, where each of the one or more surfaces having an angle of a normal at any surface point with a direction of said relative motion to be above zero degrees; and
   one or more collector gates, each located inside the apparatus adjacent to corresponding one of said one or more surfaces, each collector gate is configured, when a speed of the relative motion exceeds a threshold value, to collect an oxygen-enriched gas/air, by pulling, in the formed oxygen-enriched gas/air layer, based on a higher external pressure built in a space near the corresponding surface of the one or more surfaces than an internal pressure in a corresponding space inside of the each collector gate.

2. The apparatus of claim 1, wherein the oxygen-enriched gas/air collected individually by the one or more collector gates being combined, and the combined collected oxygen-enriched gas/air is provided to a combustion chamber/area of an engine of the apparatus for optimizing a combustion process.

3. The apparatus of claim 1, wherein the apparatus comprises a fossil-fuel burning vehicle containing an automobile, a motorcycle, a truck, an aircraft, a ship, a bus or a rocket, or a fossil-fuel burning apparatus containing a power generator, a power plant, a heater or a furnace.

4. The apparatus of claim 1, wherein the apparatus is a moving object through the atmospheric air with the speed exceeding the threshold value.

5. The apparatus of claim 1, wherein the apparatus is a stationary object and the atmospheric air is moved/blown toward the one or more surfaces of the stationary object with the speed exceeding the threshold value in the direction of said relative motion.

6. The apparatus of claim 1, wherein said angle is less than 90 degrees.

7. The apparatus of claim 1, wherein each one or more collector gates comprises a movable aperture/screen configured to adjust a portion/percentage of oxygen in the collected oxygen-enriched gas/air.

8. The apparatus of claim 7, wherein the movable aperture/screen is configured to adjust an amount of the collected oxygen-enriched gas/air through the each gate.

9. The apparatus of claim 1, further comprising a duct system to provide/combine the oxygen-enriched gas/air collected by the one or more collector gates.

10. The apparatus of claim 9, wherein the apparatus comprises multiple collector gates, and the duct system comprises corresponding multiple branches for collecting the oxygen enriched gas/air from the multiple collector gates.

11. The apparatus of claim 10, wherein each branch of the one or more branches comprises a pressure relief valve to adjust an amount of the oxygen-enriched gas/air from each of the one or more gates and to keep the internal pressure in the corresponding space inside of the each collector gate below the external pressure built in a space near the corresponding surface of the apparatus.

12. The apparatus of claim 11, wherein the pressure relief valve is adjustable depending on the speed of the relative motion.

13. The apparatus of claim 9, wherein the duct system comprises a controllable mixer configured to combine the oxygen-enriched gas/air collected by the one or more collector gates.

14. The apparatus of claim 13, wherein the controllable mixer is configured to vary an amount of the collected oxygen-enriched gas/air from any of the one or more collector gates being combined, in order to provide a desired portion of oxygen in the combined oxygen enriched gas/air.

15. The apparatus of claim 1, further comprising one or more oxygen content sensors, each oxygen content sensor is configured to analyze an oxygen content of the oxygen-enriched gas/air collected by corresponding each of the one or more collector gates to provide a preliminary tuning of a desired portion of oxygen in the oxygen-enriched gas/air by adjusting a corresponding movable aperture/screen in the corresponding each collector gate.

16. The apparatus of claim 1, further comprising a further oxygen content sensor for analyzing oxygen content of the combined oxygen-enriched gas/air collected by the one or more collector gates to provide a further preliminary tuning of a desired portion of oxygen in the combined oxygen-enriched gas/air, the further preliminary tuning is provided by one or more of: a) adjusting an amount of the oxygen-enriched gas/air from all or selected collector gates of the one or more collector gates individually, and b) adjusting a corresponding movable aperture/screen in corresponding collector gates of the one or more collector gates for a desired portion/percentage of oxygen in the collected oxygen-enriched gas/air.

17. The apparatus of claim 1, further comprising one or more exhaust sensors analyzing a composition of an exhaust gas/air from the combustion chamber for providing a feedback signal for fine tuning of the oxygen-enriched gas/air provided to combustion chamber to meet exhaust standards, the fine tuning is provided by one or more of: a) adjusting an amount of the oxygen-enriched gas/air from all or selected of the one or more gates individually, and b) adjusting a corresponding movable aperture/screen in corresponding collector gates of the one or more collector gates for a desired portion/percentage of oxygen in the collected oxygen-enriched gas/air.

18. The apparatus of claim 17, wherein the one or more exhaust sensors comprise one or more of: a temperature sensor, a particulate sensor, a carbon oxide sensor, a carbon dioxide sensor, an oxygen sensor, a water sensor, a carbon monoxide sensor, and a nitrogen oxide sensor.

19. A method comprising:
monitoring a speed of an apparatus engaged in a relative motion with an atmospheric air comprising oxygen ($O_2$) and nitrogen ($N_2$),), where one or more surfaces of the apparatus are configured to form an oxygen-enriched gas/air layer along/near each surface of the one or more surfaces by pushing the atmospheric air along the one or more surfaces during said relative motion, where each of the one or more surfaces having an angle of a normal at any surface point with a direction of said relative motion to be above zero degrees;
and when the speed of the relative motion exceeds a threshold value, collecting an oxygen-enriched gas/air by each of one or more collector gates, each collector gate is located inside the apparatus adjacent to corresponding one of said one or more surfaces, and each collector gate is configured to collect, by pulling in, the formed oxygen-enriched gas/air layer, based on a higher external pressure built in a space near the corresponding surface of the one or more surfaces than an internal pressure in a corresponding space inside of the each collector gate.

20. The method of claim 19, further comprising:
combining the oxygen-enriched gas/air collected individually by the one or more collector gates; and
providing the combined collected oxygen-enriched gas/air to a combustion chamber/area of an engine of the apparatus for optimizing a combustion process.

21. The method of claim 19, further comprising:
varying, by a controllable mixer, an amount of the collected oxygen-enriched gas/air from each of the one or more collector gates being combined, in order to provide a desired portion of oxygen in the combined oxygen enriched gas/air.

22. The method of claim 19, further comprising:
determining, by one or more oxygen content sensors, whether the oxygen-enriched gas/air, collected by corresponding each of the one or more collector gates, has a desired portion of oxygen; and
tuning a desired portion of oxygen in the oxygen-enriched gas/air by adjusting a corresponding movable aperture/screen in the corresponding each collector gate.

23. The method of claim 19, further comprising:
determining, by a further oxygen content sensor, an oxygen content of a combined oxygen-enriched gas/air collected by the one or more collector gates; and
providing a further preliminary tuning of a desired portion of oxygen in the combined oxygen-enriched gas/air by one or more of: a) adjusting an amount of the oxygen-enriched gas/air from all or selected collector gates of the one or more collector gates individually, and b) adjusting a corresponding movable aperture/screen in corresponding collector gates of the one or more collector gates for a desired portion/percentage of oxygen in the collected oxygen-enriched gas/air.

24. The method of claim 19, further comprising:
determining, by one or more exhaust sensors analyzing a composition of an exhaust gas/air from the combustion chamber; and
providing a feedback signal for fine tuning of the oxygen-enriched gas/air provided to combustion chamber to meet exhaust standards, the fine tuning is provided by one or more of: a) adjusting an amount of the oxygen-enriched gas/air from all or selected of the one or more gates individually, and b) adjusting a corresponding movable aperture/screen in corresponding collector gates of the one or more collector gates for a desired portion/percentage of oxygen in the collected oxygen-enriched gas/air.

* * * * *